April 9, 1963
B. B. BLACKFORD
3,085,024
POROUS EXTENSIBLE PRESSURE-SENSITIVE ADHESIVE TAPE IN
WHICH PERFORATIONS ARE ARRANGED TO FACILITATE TEARING
Filed May 19, 1959
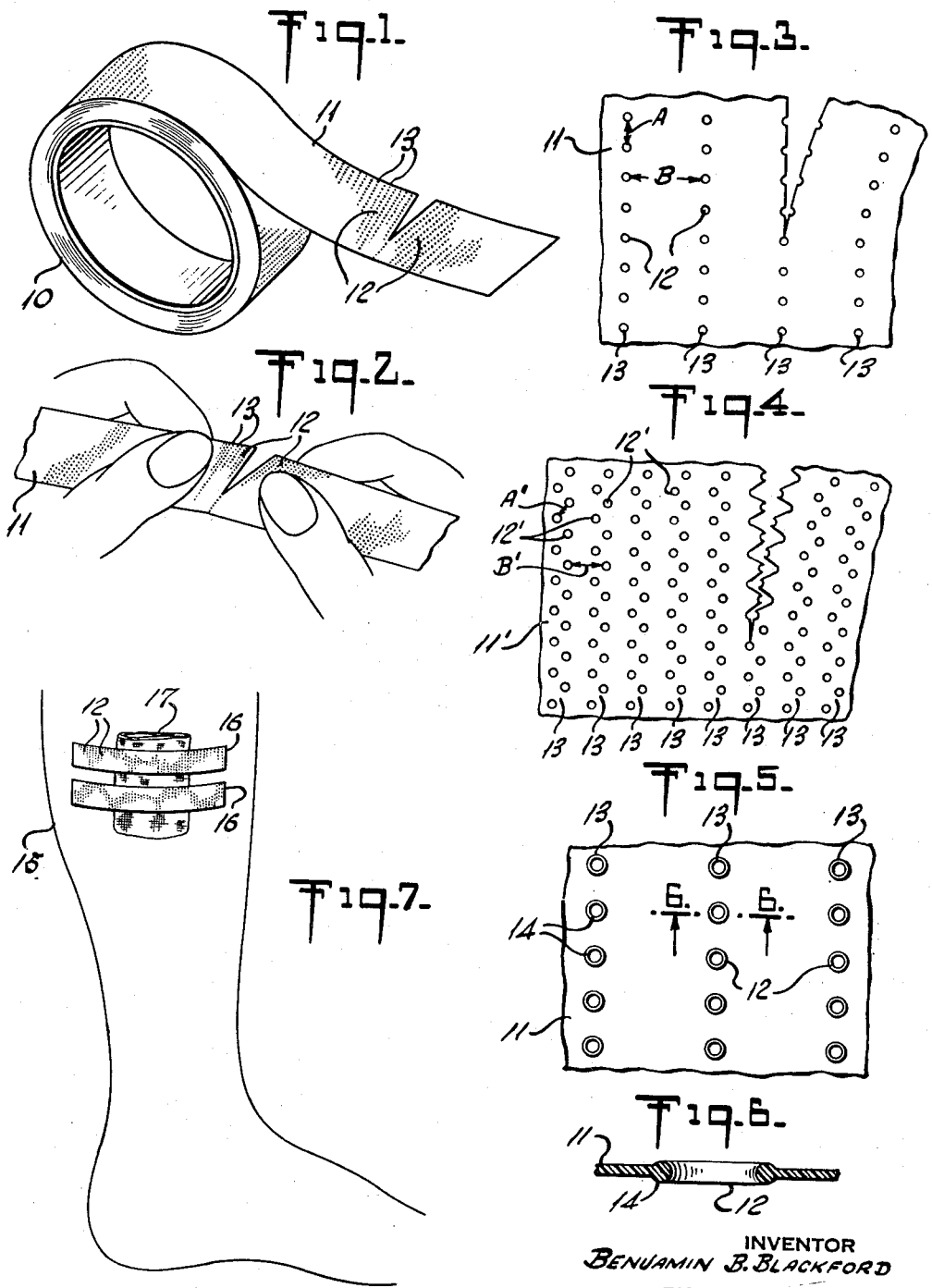
INVENTOR
BENJAMIN B. BLACKFORD
BY
Harold L. Warren
ATTORNEY

United States Patent Office 3,085,024
Patented Apr. 9, 1963

3,085,024
POROUS EXTENSIBLE PRESSURE-SENSITIVE ADHESIVE TAPE IN WHICH PERFORATIONS ARE ARRANGED TO FACILITATE TEARING
Benjamin B. Blackford, Metuchen, N.J., assignor to Johnson & Johnson, a corporation of New Jersey
Filed May 19, 1959, Ser. No. 814,178
13 Claims. (Cl. 117—4)

The present invention relates to adhesive tapes and more particularly to porous extensible pressure-sensitive adhesive tapes which can be readily torn into desired lengths and do not require the need for cutting devices.

Extensible pressure-sensitive adhesive-coated films particularly of the vinyl type have found increasing use for surgical application and are presently sold for this purpose in relatively narrow widths in dispensers provided with cutting mechanism for severing the tape. These tapes, however, although ideally suited for application to the skin because of their extensible nature are difficult to tear or cut unless some sort of reciprocating cutter mechanism is used such as scissors or the reciprocating type of cutter presently used with dispensers for this type of tape material. Because of the difficulty in tearing these extensible tapes, they are generally not sold for hospital or other use for skin application apart from a cutter as are cloth-backed surgical tapes which can be readily torn into desired lengths. Also, any cutter suitable for cutting these readily extensible tapes is generally substantially more expensive than cutting devices suitable for non-extensible film tapes, such as cellophane pressure-sensitive adhesive tapes which can be readily torn by tearing against a serrated edge. As a result, the dispenser and cutter assembly for the vinyl tapes is generally relatively expensive as compared with the tape itself. Also, the extensible nature of the tape makes it difficult to design a suitable cutter for cutting tape of any substantial width. Surgical vinyl tapes with dispenser and cutter have therefore generally been sold in relatively narrow widths. By "extensible" is meant those tapes having an elongation of at least 50% at 5.0 lbs. per inch width tension when elongated at the rate of 20 inches per minute after conditioning at 70° F. and 65% relative humidity.

It would be highly desirable to have a tape of this elastic extensible nature which can be readily torn and dispense with the need of special cutter devices for severing the same. It is accordingly an object of the present invention to prepare elastic vinyl tapes which can be readily torn into desired lengths. Since these tapes are used primarily for skin application, it is a further object of the present invention to prepare tapes which can be readily torn into any desired length which are pervious over substantially their entire area to permit moisture to readily pass therethrough. It is a still further object to prepare tapes of extensible nature which, although readily tearable in their crosswise direction, have a sufficiently high tensile strength to permit unwinding from a roll without breaking and use in wrapping an injured member or holding a dressing on the body. These and other objects and advantages will become more apparent as the invention is described further.

It has now been discovered that a porous elastic or otherwise extensible pressure-sensitive adhesive tape can be prepared which can be readily torn into desired lengths by perforating the entire surface of the pressure-sensitive adhesive tape with a pattern of perforations hereinafter to be more specifically described. It is recognized that perforations have heretofore been used for giving a preferred direction of tear to sheet material. Thus, it is common practice to place a series of perforations in a line across a sheet such as a sheet of postage stamps so that the sheet will tear readily along the perforated line in preference to tearing at some other point. This, however, should not be confused with the manner of perforating of the present invention. The perforations as used, for example, in a sheet of postage stamps are provided to tear the sheet of stamps into pre-determined segments or lengths. In the present instance, however, a tape designed to be divided into pre-determined sections or lengths would not be satisfactory since the length of tape strip desired would vary substantially, depending on the particular application for which the tape is used. The perforations in the extensible vinyl tape must, therefore, be of such nature and so placed that they do not excessively weaken the tape in its lengthwise direction and at the same time permit its tearing at almost any point in a substantially straight line across the width of the tape. In order for the tape to be suitable for securing dressing pads to the body of a patient, or sufficiently strong that the same can be unwound readily from a roll without breaking, the tape should have a tensile strength in its lengthwise direction of at least 5 lbs. per inch width. If the tensile strength falls much below this, even through the tape may be readily torn into desired lengths, the tape is too weak for most practical purposes.

The invention is further described by reference to the drawings, in which:

FIG. 1 is a roll of tape, made in accordance with the present invention, a portion of which has been unrolled and partially torn;

FIG. 2 is a view showing the removal of a section of tape by tearing and illustrates that several tear zones may be present between the areas where the tape is grasped;

FIG. 3 is an enlarged view of a section of the tape of FIG. 2 showing the relationship between the perforations;

FIG. 4 is a tape having a different perforation pattern;

FIG. 5 is an enlarged view of the perforations in a tape in which the perforations have been formed by heated projections;

FIG. 6 is an enlarged cross-sectional view taken along line 6—6 of FIG. 5; and

FIG. 7 illustrates use of the tape in applying a dressing to the skin.

Referring to the drawings, it will be noted that the tape 11 contains a plurality of small perforations 12 arranged in lines 13 forming tear zones running crosswise of the tape, the tear zones being spaced a relatively short distance from each other so that the tape can be torn into any desired length. In order to provide a tape which can be torn by grasping at any point, the lines of perforation should preferably not be spaced more than about ¼ inch from each other. The tear lines may be as close together as desired, the closer the more desirable as long as the spacing between the lines is slightly greater than the spacing between adjacent holes in a line. Also, in order to not overly weaken the tape, the perforations in any line should be such that not more than about 50% of the tape is removed or displaced.

The arrangement of perforation and relative spacing between the perforations is best illustrated by the enlarged view of perforations given in FIGS. 3 and 4. Referring to FIG. 3, it will be noted that the distance A between the linearly arranged perforations in any line or zone 13 is less than the distance B, which is the shortest distance between perforations in any one line or zone 13 and those in an adjacent perforated line or zone 13. It has been found that unless the spacing A between adjacent perforations in a single line is maintained at least 10% less than the shortest distance between perforations in adjacent lines that the tape instead of tearing directly across the tape along a perforated line 13 will tear either diagonally across the tape or after tearing a short distance will start to tear lengthwise of the tape. Generally, the distance A between perforations will not exceed about 1/10 inch, otherwise difficulty in tearing may be encountered because of the extensible nature of the film. With less extensible films, difficulty in tearing is reduced and in some instances the spacing may exceed this amount. However, with vinyl films containing about 23 to 50% by weight plasticizer, the spacing between individual perforations 12 in any tear line or zone 13 should not exceed about the 1/10 inch mentioned.

In FIG. 4, a somewhat different tear zone is used than that illustrated in FIG. 3. The tear zone 13' of FIG. 4 is composed of two closely spaced parallel lines of perforations 12' in which the perforations are staggered with respect to each other in the two lines to give a serrated tear when the tape is torn. The adjacent tear zones, which are also made up of a plurality of lines of perforations, are so spaced with respect to each other than the shortest distance B' between perforations in adjacent tear zones 13' is greater than the distance A' between adjacent perforations 12' in a single tear zone. Again the distance A' should be at least 10% less than the distance B'.

In the preferred practice of the invention, the perforations are in the form of complete openings rather than weakened areas as might be produced by a plurality of pin pricks since a film readily permeable to air is highly desirable, particularly for application to the skin, which is the primary use of the tapes of the present invention. Accordingly, the holes are preferably formed either by punching or melting the film material. The preferred tapes for skin application should have an open area as provided by the perforations of 0.01 to 0.15 square inch per square inch of tape. The openings should preferably also be rounded, i.e., they should have rounded edges and be devoid of any angular cuts such as would be present with triangular or square-shaped openings. If the edges of the openings are not rounded, there will be found a tendency for the tape to tear away from the line of perforations. This results in a lengthwise tearing of the tape rather than a crosswise tear which is, of course, objectionable. It has also been found that where the openings are formed by relatively straight cuts intersecting at sharp angles, as occurs with triangular or rectangular openings, the tensile strength for equivalent open areas is substantially reduced as compared with that of tapes in which the openings have rounded edges. Also, in the preferred practice, particularly with plasticized vinyl chloride film backings, the perforations have a diameter of about 0.002 to 0.020 inch with the tear zones being spaced about 0.015 to 0.08 inch from each other.

Vinyl tapes are thermoplastic and the holes accordingly can be formed by melting rather than cold punching or piercing. An advantage to melting the holes, as illustrated in FIGS. 5 and 6, is that when the holes 12 are formed by passing a heated projection through the tape the plastic vinyl film is caused to flow to the side. This builds up a bead 14 of displaced vinyl around the edge of the holes 12 so formed. This bead, which is best illustrated in FIG. 6, is insufficient to prevent tearing of the tape in the direction of the line perforation but adds to the strength of the tape in its lengthwise direction. This enables the manufacture of more porous tapes without overly weakening the same. Where the holes are formed by melting, as described, the distance between adjacent holes along a tear line, that is, the distance A of FIG. 3, can be reduced to where it is only 50% of the unperforated tape, i.e., the tape along the line prior to perforation. Where the holes are punched, however, it is necessary to maintain this distance such that only about 30% of the tear line is open area, the remaining 70% being unperforated tape. It is thus apparent that with holes formed by melting a larger area of the tape can be open. This gives a product having a greater porosity than can be obtained by punching.

The invention is further illustrated by the following examples, which are given for purposes of illustration only, the invention not being limited thereto.

*Example I*

A vinyl chloride film having a gauge of about 3.7 mils, an extensibility of about 200% and a pressure-sensitive adhesive spread at an average gauge of about 0.0022 inch is perforated by pressing against the film while supported on a carrier a plurality of spaced projections heated to a temperature of 400° F. The projections are so spaced and of such dimensions as to form in the film a perforation pattern similar to that of FIG. 3, wherein the individual holes have a diameter of 0.006 inch, the spacing between adjacent holes in a tear line is equal to 0.025 inch and the spacing between holes in adjacent tear lines is equal to 0.066 inch. The open area of the entire perforated surface thus obtained is equal to 1.66% of the film so perforated. The tensile strength before perforation of the film is 11 lbs. per square inch. After perforation, the tensile strength in the longitudinal direction is found to be 7.7 lbs. per square inch, which is sufficient to prevent tearing of the film when used for applying dressings to the skin or when unwinding from a roll of the same.

On tear tests of the film, it is found that the film can be readily torn into various length by grasping the film at its edge anywhere along the length of the film and subjecting it to a tearing force. The tear found to go directly across the film and not cut across the individual tear lines. Also, no maceration of the skin occurs when the film is worn for as long as 24 hours, as for example by wrapping around the finger.

*Example II*

A perforated film is prepared in a manner similar to that of Example I. The perforated film differs primarily from the perforated film of Example I in that the holes have a diameter of 0.007 inch. The distance between tear lines is 0.066 inch, which is the same as that for the film of Example I. By using the larger holes, the porosity of the film is substantially increased, the open area of the film being 2.31%. The tensile strength of this film in its lengthwise direction is 7¼ lbs. per inch. The film can be readily torn in two by grasping anywhere along its edge and tearing. The tear occurs directly across the film in a straight line. The film can be readily unwound when in roll form without breaking. Also, there is no difficulty with breaking when used in applying dressings.

*Example III*

Using a starting film similar to that of Example I and perforating with heated projections, as described, a perforated film is prepared having a tear pattern similar to that of FIG. 4. The holes, which have a diameter of 0.009 inch, are spaced in the tear line, .025 inch from each other. The distance B' of FIG. 4, i.e., the distance between holes of adjacent tear lines, is 0.046 inch. The over-all tensile strength of the perforated film is 8⅓ lbs. per inch. The open area, however, is increased by this particular manner of perforation, the open area being 4.0% of the perforated film. The film is strong, permitting ready unwinding without tearing. However, it can be readily torn in two by grasping anywhere along its edge. The tear occurs along a tear line between the staggered holes, giving a tear similar to that illustrated in FIG. 4.

Although the invention is applicable to any extensible film backing, the preferred tapes are formed of pressure-sensitive adhesive-coated plasticized vinyl films, polyvinyl chloride films being particularly suitable for use as surgical tapes. Plasticized polyvinyl chloride films of this type are well-known, specific formulations for the same being given, for example, in U.S. Patents 2,882,179 and 2,862,846. The polyvinyl chloride film may be formed of commercial polyvinyl chloride resin containing about 5 to 40% of a migratory plasticizer, such as tricresyl phosphate, based on the weight of the backing and optionally may also contain a permanent or non-migratory plasticizer such as a polyester made from a glycol and adipic acid, the non-migratory plasticizer being present in amounts of about 15 to 25% of the backing. A stabilizer is also preferably added in amounts of about 1 to 5% of the backing. Pigments or coloring matter may also be included, these generally not being used in amounts in excess of about 15% of the backing. Percent throughout is percent by weight. Preferably a primer, which may be any conventional primer, is applied to the film backing prior to applying the adhesive mass.

The invention has been illustrated in connection with certain embodiments thereof, although many modifications are within its spirit. It is to be limited, therefore, only by the scope of the appended claims.

Having thus described my invention, I claim:

1. A perforate, extensible, pressure-sensitive adhesive tape having an over-all perforate pattern in which the distance between individual perforations does not exceed more than ¼ inch, said tape comprising an extensible film backing, a pressure-sensitive adhesive coating on said film backing, and closely-spaced tear zones extending across said tape from one side edge of said tape to the other, said tear zones being formed of said perforations and spaced no more than ¼ inch from each other, the distance between adjacent perforations in a tear zone being at least 10% less than the distance between adjacent tear zones, whereby said tape can be readily torn along said tear zones into varying lengths of over-all perforated tape, each length containing a plurality of tear zones.

2. An extensible pressure-sensitive adhesive tape of claim 1 in which said film backing is formed of a thermoplastic film and in which the edges of said perforations are reinforced with a bead of thermoplastic backing material.

3. An extensible pressure-sensitive adhesive tape of claim 1 in which the perforations forming a tear zone are in a straight line extending across said tape.

4. An extensible pressure-sensitive adhesive tape of claim 1 in which the perforations forming a tear zone are in two substantially parallel lines, the perforations in one line being offset with respect to the perforations in the adjacent line.

5. A perforate extensible pressure-sensitive adhesive tape having an over-all perforate pattern in which the distance between individual perforations does not exceed more than ¼ inch, said tape comprising an extensible film backing, a pressure-sensitive adhesive coating on one side of said backing, perforations extending through said backing and said pressure-sensitive adhesive coating, said perforations having rounded edges and providing in said tape for each square inch of backing an open area of at least 0.01 square inch, said perforations extending across said tape in a plurality of closely spaced tear zones, the distance between adjacent tear zones not exceeding about ¼ inch and the distance between adjacent perforations in a tear zone being at least 10% less than the distance between adjacent tear zones, said tape being readily torn along a tear zone by grasping said tape for tearing at any point along its length and then tearing across said tape.

6. An extensible pressure-sensitive adhesive tape of claim 5 in which said backing is formed of a thermoplastic material and the edges of said perforations are reinforced with a bead of said thermoplastic material.

7. An extensible pressure-sensitive adhesive tape of claim 6 in which the backing is formed of an extensible vinyl film.

8. An extensible pressure-sensitive adhesive tape of claim 7 in which the backing is formed of a plasticized polyvinyl chloride film.

9. An extensible pressure-sensitive adhesive tape of claim 8 in which said polyvinyl chloride film backing is a plasticized polyvinyl chloride film backing containing about 23 to 50% by weight plasticizer based on the weight of the backing and the distance between adjacent perforations in a tear zone does not exceed about 1/10 inch.

10. An extensible pervious pressure-sensitive adhesive tape of claim 6 in which the perforations forming a tear zone are in a straight line extending across the tape.

11. An extensible pervious pressure-sensitive adhesive tape of claim 6 in which the perforations forming a tear zone are in two substantially parallel lines, the perforations in one line being offset with respect to the perforations in the adjacent line.

12. A perforate extensible pressure-sensitive adhesive tape having an over-all perforate pattern in which the distance between individual perforations does not exceed more than ¼ inch, said tape comprising an extensible film backing, a pressure-sensitive adhesive coating on one side of said backing, perforations extending through said backing and said pressure-sensitive adhesive coating, said perforations being formed with rounded edges and having a diameter of about 0.002 to 0.02 inch and providing in said tape for each square inch of backing an open area of 0.1 to 0.15 square inch, said perforations extending across said tape in a plurality of closely spaced tear zones, the distance between adjacent tear zones not exceeding about ¼ inch and the distance between adjacent perforations in a tear zone being at least 10% less than the distance between adjacent tear zones, said tape being readily torn along a tear zone by grasping said tape for tearing at any point along its length and then tearing across said tape.

13. An extensible pressure-sensitive adhesive tape of claim 12 in which said backing is formed of a thermoplastic material and the edges of said perforations are reinforced with a bead of said thermoplastic material.

References Cited in the file of this patent

UNITED STATES PATENTS

| | | |
|---|---|---|
| 2,115,122 | Prudden | Apr. 26, 1938 |
| 2,308,693 | Goldman | Jan. 19, 1943 |
| 2,647,065 | Scholl | July 28, 1953 |
| 2,680,558 | Mai | June 8, 1954 |
| 2,740,403 | Schueler | Apr. 3, 1956 |
| 2,819,180 | Koenig | Jan. 7, 1958 |
| 2,877,141 | Shelley et al. | Mar. 10, 1959 |
| 2,914,166 | Bihler | Nov. 24, 1959 |